Oct. 19, 1954
H. J. SNELSON
2,691,987
LIQUID TRANSFER APPARATUS
Filed July 20, 1949
3 Sheets-Sheet 1
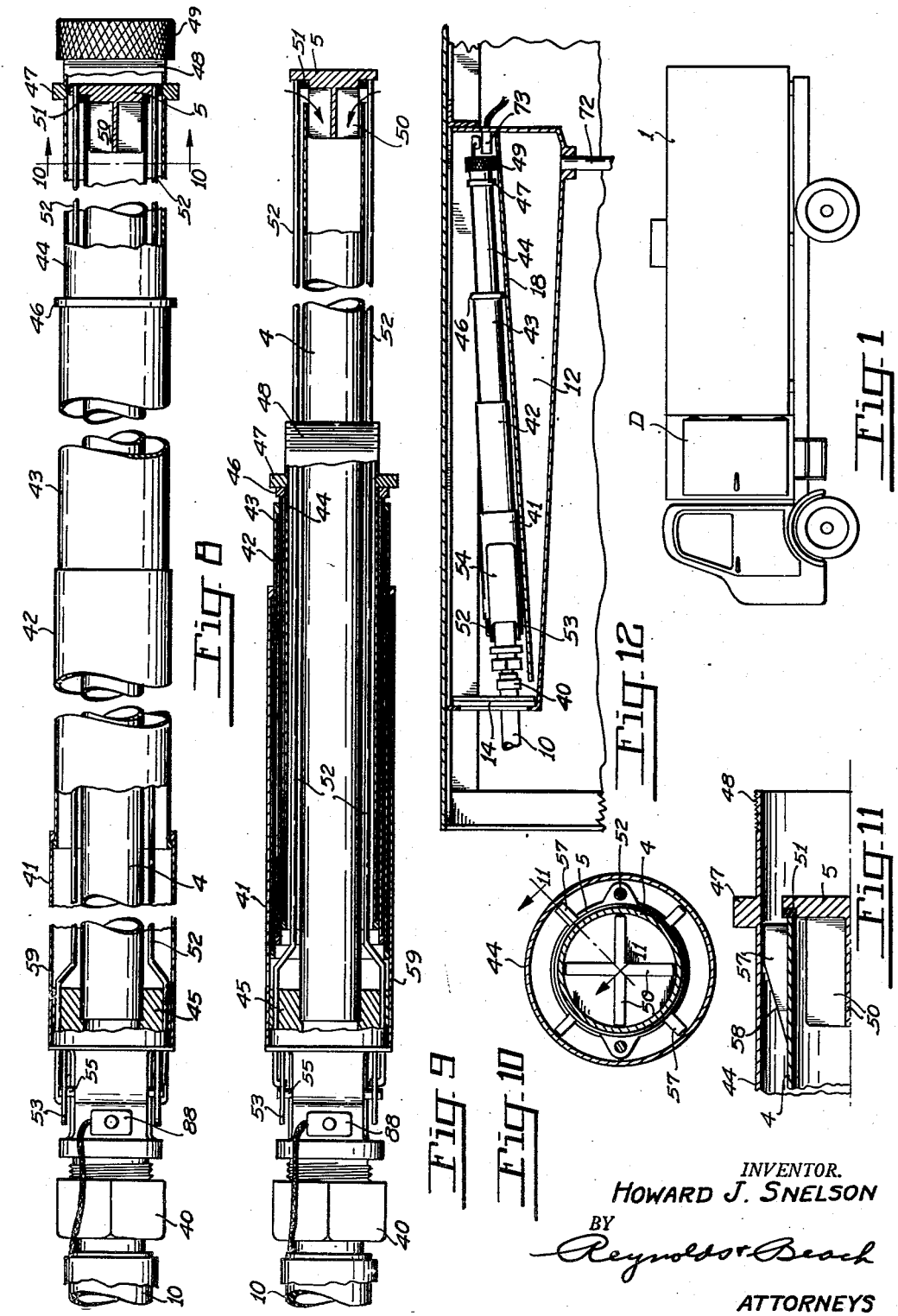
INVENTOR.
HOWARD J. SNELSON
BY
Reynolds Beach
ATTORNEYS

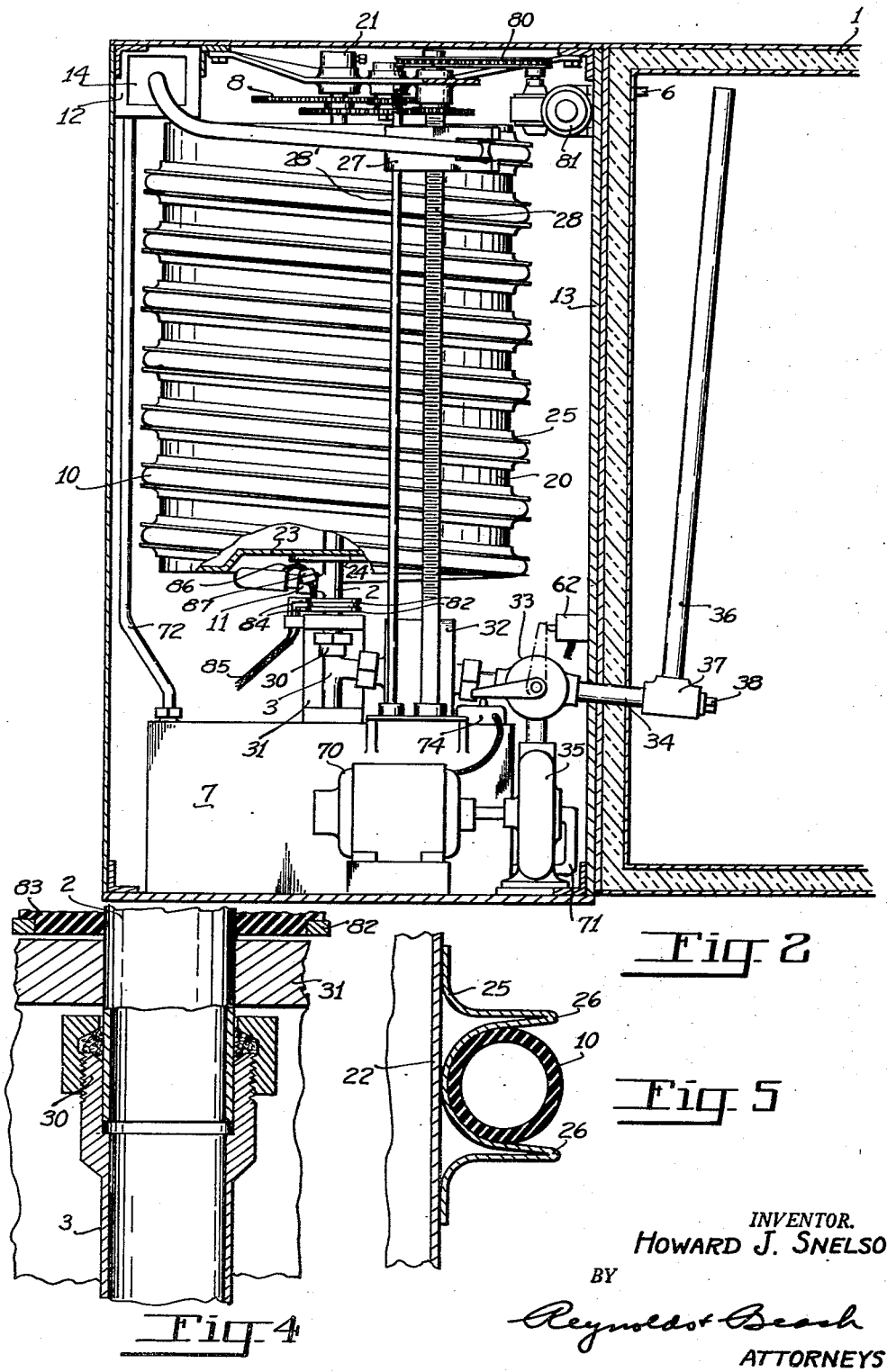

Oct. 19, 1954      H. J. SNELSON      2,691,987

LIQUID TRANSFER APPARATUS

Filed July 20, 1949      3 Sheets-Sheet 3

INVENTOR.
HOWARD J. SNELSON
BY
Reynolds + Beach
ATTORNEYS

Patented Oct. 19, 1954

2,691,987

UNITED STATES PATENT OFFICE 2,691,987

LIQUID TRANSFER APPARATUS

Howard J. Snelson, Seattle, Wash.

Application July 20, 1949, Serial No. 105,684

20 Claims. (Cl. 137—238)

The liquid transfer apparatus to which this invention pertains is particularly concerned with the arrangement and storage on a tank truck of apparatus utilized to deliver liquid to the tank of such a truck, preferably of the automotive type. This apparatus is especially useful for filling a tank truck with edible liquid, such as milk, and incorporates mechanism for readily cleansing and disinfecting the apparatus after being used.

While in the past it has been customary for small dairies to place milk in large cans to be picked up and transported bodily to bottling plants, the apparatus of this invention is intended principally to collect milk from storage tanks at farms and small dairies and to transfer it to the tank of an automotive tank truck where it will be mingled with other milk. In such a program the milk transferring apparatus will be used only intermittently to convey milk from a farm tank to a truck tank, and consequently should be cleansed and disinfected between each such use. It is an object of the present apparatus to keep all parts of it which the milk contacts as clean and sanitary as possible and to cleanse and disinfect them readily, and preferably automatically or semi-automatically, after each use. In addition, the compartment housing the transfer mechanism may be refrigerated to retard the growth of bacteria.

The apparatus in general includes a hose to serve as a conduit for transferring milk from a storage tank to a transportation tank, one end of which hose is connected to the transportation tank. The hose is stored on a reel preferably arranged with its axis upright and its free end, adapted to be placed into milk in a storage tank, normally is covered by a tubular sheath which may be composed of several telescoping sections. Alternatively the hose may be connected to a drain fitting in such a storage tank. Apparatus is provided for flushing the hose throughout its length and also the space between the outside of its free end and the inside of its protective sheath with liquid for cleansing and disinfecting purposes. This cleansing operation can be accomplished virtually automatically by providing a control actuated to initiate the flushing operation by the act of placing the free end of the hose in stored position, and a time control to terminate the flushing operation.

The automatic features of the apparatus not only facilitate operation of the equipment, but insure that adequate flushing of it after each use will not be neglected.

Additional features and objects of the invention will be pointed out in the following detailed description of the preferred form of apparatus shown in the accompanying drawings.

Figure 1 is a side elevation view of an automotive tank truck incorporating filling apparatus for the tank.

Figure 2 is an enlarged fragmentary side elevation view of the automotive tank truck particularly showing the filling apparatus in stored position.

Figure 4 is a detail longitudinal sectional view through the swivel pipe mounting beneath the hose reel.

Figure 5 is a fragmentary detail vertical sectional view through a portion of the hose reel periphery and the hose received thereon.

Figure 8 is a side elevational view of the sanitary cover or sheath for the free end of the hose with parts broken away to reveal the hose and valve structure, the valve being in closed position, and Figure 9 is a generally similar view showing the cover retracted and the valve in open position.

Figure 10 is a transverse sectional view through the free hose end taken on line 10—10 of Figure 8 showing the valve structure, and Figure 11 is an enlarged fragmentary longitudinal section through the hose end on line 11—11 of Figure 10 showing the valve structure in detail.

Figure 12 is a vertical section through the hose end storage compartment showing the hose end in stored position.

Figure 7:
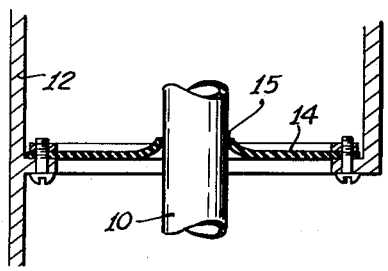
Figure 7 is a fragmentary detail horizontal sectional view through the entrance portion of the free hose end storage compartment.

While my particular application of the tank filling apparatus has been shown in the accompanying drawings as applied to an automotive tank truck, it will be appreciated that similar apparatus could be utilized for filling the tank of a trailer or a semi-trailer, or even a railroad tank car. In each instance the tank to be filled will be designated a transportation tank as distinguished from the tank from which the liquid is removed, which latter tank will be termed the storage tank.

While, as mentioned previously, it is contemplated that such storage tanks for storing milk will be located at farms or small dairies, they may be merely milk cans, or may be mobile tanks such as automotive tank trucks from which liquid such as milk is being transferred to larger transportation tanks, for example railway tank cars. Also, of course, the tank into which the milk or other liquid is transferred may actually be a large storage tank, although designated in this description as a transportation tank, whereas the tanks from which the liquid is removed themselves may be transportation tanks such as those of automotive tank trucks, which tanks will be embraced within the term "storage tank" as used in this description.

In any of these instances the milk is transferred to the transportation tank 1 through a conduit incorporating a flexible hose 10, one end of which remains connected to the tank filling apparatus and the other end of which is free to be dipped into or otherwise connected to a storage tank from which the liquid is to be conveyed to the transportation tank. Such filling or liquid transfer apparatus is housed in a cabinet 13 just ahead of the truck tank 1 which is closed by a door D as shown in Figure 1. This cabinet may be insulated or refrigerated, if desired, to retard the growth of bacteria in the liquid transfer apparatus.

As shown in Figure 2, the anchored end of the hose 10 may be secured by a suitable coupling 11 to the lower end of an upright tube 2, constituting part of the axle for a hose reel or winding drum 20, about the periphery of which the hose 10 is wound.

A stationary tube 3 arranged below tube 2 and in alignment with it is connected to such tube by a sealed joint including the packing gland 30. The lower end of the tube 2 is guided for rotation in a bearing bracket 31. In order to prevent the weight of the drum assembly from acting on the tube 3 through the tube 2, it is preferred that the drum assembly be suspended by the upper end of the drum axle mounted in a suitable rotative end thrust bearing structure 21. This may be merely a plain bearing because the rotation of the drum 20 will be very slow as the hose 10 is pulled outward or wound upon the drum.

The drum 20 itself is formed of a cylinder 22 preferably of sheet metal, having end disks or spiders 23 secured to hubs 24 mounted on the drum axle. In order to insure that the free end of the hose will always occupy a predetermined position relative to the drum 20 within close limits when the hose is fully wound upon it, it is preferred that a helical guide channel element 25, also formed of sheet metal, be applied to the exterior surface of the drum as shown best in Figures 2 and 5. Alternatively, the drum itself might be formed to define a helical groove in its surface to receive the hose. In either event the lands 26, defining opposite sides of the hose receiving groove, should project sufficiently, at least at the lower side of such groove, to constitute a helical shelf on which the hose may rest to prevent it from sliding downward along the surface of the drum even though wound rather loosely.

Figure 6:
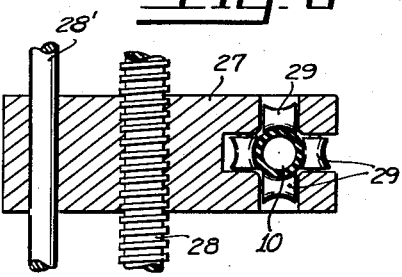
Figure 6 is a fragmentary detail side elevation view of winding mechanism for guiding winding of the hose onto and off the hose reel.

To facilitate handling the hose while it is being unwound from the drum, and particularly while it is being wound upon the drum, the hose is passed through a guide block 27 shown in detail in Figure 6, which is mounted upon a screw 28 and slidable along a guide rod 28' to prevent the block from turning. In this guide block are journaled rollers 29 arranged in a cluster, preferably as two pairs of opposed rollers. The rollers of one pair are journaled upon parallel spaced axes, while the rollers of the other pair are journaled upon parallel spaced axes disposed perpendicular to the axes of rotation of the first pair of rollers. In whatever direction the hose 10 may be pulled, therefore, it will bear upon at least one of these rollers to prevent chafing it.

Figure 3:
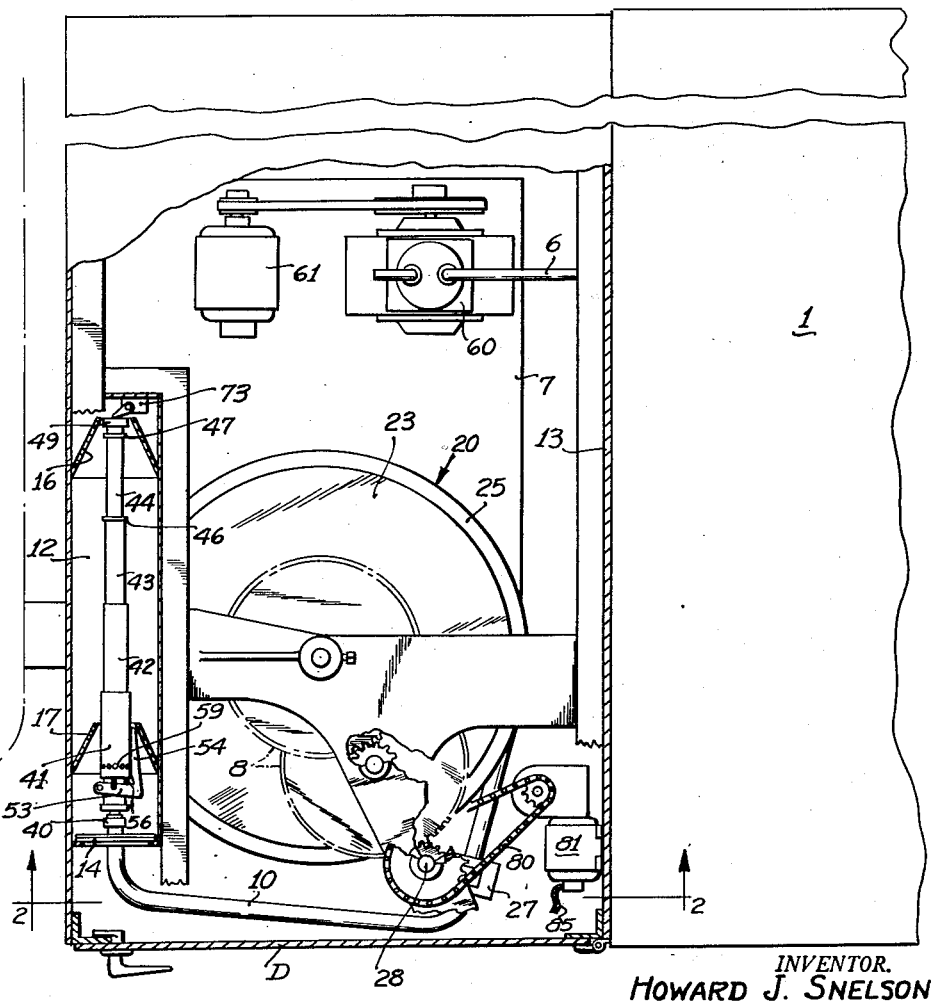
Figure 3 is an enlarged fragmentary plan view of the automotive tank truck with parts broken away to reveal the liquid transfer apparatus of the invention.

As screw 28 is rotated it will shift the guide block 27 lengthwise of drum 20. Drive mechanism is provided to interconnect the screw and drum rotatively, shown in the upper portion of Figure 2 as the gearing 8, in a manner to coordinate the rotation of the drum and screw to dispose the aperture between the rollers 29 of the guide block 27 in a position always in substantially tangential registry with a portion of the hose-receiving groove in the drum, as shown in Figure 3. Such relationship between the screw and drum will, of course, be maintained in whichever direction the drum is rotated, and whether it is rotated by power applied to the drum or by tension exerted on the hose 10.

To receive the free end of the hose when the hose has been wound upon the drum as shown in Figure 2, a box 12 is formed in the upper portion of the hose reel compartment 13. This box should be located at one side of the compartment in a position adjacent to the natural stored position of the free end of the hose so that such hose end may be lodged in the box with a minimum of hose deformation. This box, as shown best in Figures 2 and 3, is long and narrow, so that no unnecessary clearance will be left around the free hose end, yet ample space will be provided for it.

The box 12 is closed at all sides and at its inner end by rigid walls. Its outer end is covered by a diaphragm 14, as shown in Figure 7, having a central aperture 15 through which the free end of the hose may be pushed lengthwise. This diaphragm preferably is formed of rubber so that it will be stretched by insertion of the hose end through the aperture and then will contract to draw the edges of such aperture close about the hose end. The edges of the aperture in diaphragm 14 may embrace the free end of the hose sufficiently firmly to retain it in the box 12, or appropriate latch mechanism may be provided to supplement the retaining action of the diaphragm.

The free end of the liquid transferring conduit preferably is not flexible, but is a metal pipe 4, such as of Monel metal or stainless steel, on the end of the flexible hose 10, as shown in Figures 8 and 9, to facilitate dipping the conduit end into the liquid in a storage tank and subsequently cleaning it.

Only the tube 4 need be dipped into a storage tank for the purpose of extracting the milk or other liquid from it, and it is not necessary that the hose 10 touch the interior of the storage tank at all. In fact, it is preferred that only a portion of the length of pipe 4 be dipped into the storage tank. One end of this pipe may be connected to the hose by a suitable separable coupling, such as the screw-threaded coupling 40. Alternatively this separable coupling may be connected directly to a drain fitting on a storage tank, in which case the pipe 4 would not be used.

When the tube 4 is dipped into the liquid in the storage tank to extract the liquid from it, it is desirable to insure that the exterior wall, as well as the interior, of this pipe, is perfectly clean and sanitary if the purity of the liquid is important, as it is in the instance of milk. Consequently, except while the pipe is actually in the storage tank, it is desirable for it to be covered completely by a suitable sheath, which preferably takes the form of a telescoping tubular cover composed of an outer, stationary tubular section 41 and one or more telescoping inner tubular sections 42, 43 and 44, shown in Figures 8 and 9. The interfitting ends of these tube sections are shown to be flanged, so that, as the cover is extended, no section can be completely separated from the section in which it fits.

Conversely, retracting movement of the various tube sections is also limited, that of section 42 by engagement of its inner end with a plug 45 in the outer tube section 41, forming an inner end wall for the tubular sheath but apertured to receive pipe 4, that of tube section 43 by a terminal flange 46 engageable with the outer end of tube section 42 and that of tube section 44 by an annular shoulder 47 formed on such tube section adjacent to its free end which is engageable with the outer end of tube section 43. On the outer end of tube section 44 beyond shoulder 47 are threads 48 by which a cap 49 may be removably secured to cover the end of the tube.

It is preferred that the milk or other liquid be drawn through the hose 10 by suction produced by partially evacuating the truck tank with which the hose is connected. It is desirable, therefore, for the free end of the hose to be closed except when liquid is actually being drawn through it. For that purpose a valve 5 is provided to seal the open end of pipe 4 constituting the end of hose 10, and disposed within the tube sheath. This valve is guided for reasonable movement lengthwise of pipe 4 by inwardly projecting webs or fins 50 slidable into the open end of the pipe, and a gasket 51 is carried by the valve 5 to seat on the pipe end.

The valve 5 is normally drawn into sealing engagement with the end of pipe 4 by two rods 52 connected by one end to opposite sides of the valve 5, their other ends being slidable through guide apertures in the plug 45 and connected to the yoke 53 of an operating handle 54. The yoke is integral with this handle and is pivoted on pins 55 disposed so that the yoke straddles the pipe 4. A spring 56 urges the handle 54 away from tube section 41 so that the rods 52 are always pulled in the direction to draw valve 5 against the end of the pipe. The action of depressing handle 54 toward tube section 41, however, will swing the yoke 53 in a direction to move rods 52 lengthwise for sliding valve 5 away from sealing engagement with the end of pipe 4.

To avoid interference between the inner tube section 44 and the valve-operating rods 52, it is preferred that ribs 57 be provided on the exterior of pipe 4 adjacent to its free end, such ribs extending lengthwise of the pipe and having inclined surfaces 58 which may be contacted by tube section 44 for centering it relative to pipe 4 as the sheath is drawn over the inner pipe to cover it. These ribs are shown in Figures 10 and 11.

From the fitting 3 to which the anchored end of hose 10 is connected through coupling 11 and tube 2, the milk or other liquid will flow through a suitable meter 32 into a flow direction selector valve 33, which can connect the fitting 3 either to the liquid-discharge pipe 34, or to a pump 35 used to flush the hose with cleansing or disinfecting liquid.

Because, as indicated previously, it is preferred that the milk or other liquid be transferred from the storage tank to the transportation tank by suction, the upper portion of tank 1 will be evacuated to the desired degree by withdrawing air from it through a pipe 6 near its upper end. A vacuum pump 60 connected to pipe 6, shown in Figure 3, will accomplish this result. Such pump may be driven by a motor 61 controlled by switch 62. To enable air mixed in the milk or other liquid to escape readily rather than being retained in the liquid in the storage tank, an upright length of pipe 36 is connected to the supply pipe 34. A T fitting 37 interconnects these two pipes, one end of which is closed by a plug 38 affording access to the pipe 34 for cleaning purposes.

Immediately after each delivery of liquid from a storage tank to the transport tank 1, the entire interior of hose 10 is flushed, as well as the exterior of pipe 4 forming its free end portion. The flushing operation may utilize a single liquid contained in tank 7 shown in Figure 2, having both cleansing and germicidal properties, or two such tanks may be provided, one containing a cleansing liquid and the other a disinfecting fluid. Alternatively, tank 7 may be divided into two separate compartments, one for each of these types of fluid. If separate cleansing and disinfecting operations are employed, they should be carried out in sequence and, in any event, the flushing operation should be largely automatic, requiring little attention or expenditure of time on the part of the operator to accomplish. Such operation will further practically eliminate the possibility of the operator forgetting or neglecting to flush the hose after each delivery to tank 1.

The flushing operation will be accomplished by motor 70 driving pump 35 which withdraws flushing liquid from tank 7 through a pipe 71 and forces it through the body of valve 33 and fitting 3 into the hose 10. The flushing liquid proceeds up through the hose and pipe 4. Valve 5 will be held unseated during this operation by designing the box 12, in which the free end of the hose is stored, small enough, or providing in it a constriction 17 as shown in Figure 3, so that the handle 54 must be depressed in order to place the hose end fully in the compartment. The flushing liquid passing through the end of pipe 4 past the valve 5 will be prevented by the cap 49 from being discharged directly out of the free end of the smallest cover tube section 44. As shown in Figures 8 and 9, however, there is considerable space between the outer side of the pipe 4 and the inner surface of the telescoping sheath, and consequently the flushing liquid will flow over the exterior of pipe 4 in the opposite direction from its free end back to the plug 45, and the liquid will then be discharged from the sheath through apertures 59 adjacent to such plug. Liquid thus discharged into the box 12 through the apertures 59 will flow along its sloping partition 18 on which the pipe cover rests, then reversely along its sloping bottom as shown in Figure 12, to one end of such box, and downward through pipe 72, shown in Figures 2 and 12, back into the tank 7 for recirculation through the hose 10.

Initiation of the flushing operation is effected semi-automatically by mounting a switch 73 at the end of box 12 remote from its closure diaphragm 14 which is in series with a timing switch 74 and motor 70. Engagement of switch 73 by cap 49 of the sheath for the hose end is insured by mounting guide plates 16 in converging relationship in the end of such compartment as shown in Figure 3, so that the end of the sheath will be guided for movement toward such switch. Because switches 73 and 74 are arranged in series it obviously is impossible to initiate or continue the flushing operation when the hose is not in box 12, which would result in the flushing liquid being forced into the hose and trapped in it by valve 5, instead of the liquid passing through the hose, or in loss of liquid through apertures 59 if the valve is opened by pressing handle 54. Switch 74 is disposed to be engaged by the handle of valve 33 in moving it manually between the position establishing communication of fitting 3 with pipe 34 and the position establishing communication from fitting 3 to pump 35. Consequently the flushing pump cannot be started or continued in operation if pipe 3 is not in communication with the pump.

Timing mechanism may be associated with switch 74, its operation being initiated by closing of such switch to maintain the circuit of motor 70 energized to effect flow of the flushing liquid through the hose 10 for a predetermined time interval, after which switch 74 will be opened or a circuit closed for effecting a further flushing or disinfection operation. Release of switch 74 by movement of the handle for valve 33 in repositioning it to connect fitting 3 to pipe 34 rather than to pump 35, when the hose 10 is to be unreeled for the next liquid transfer operation, will effect resetting of the timing mechanism associated with such switch. At the termination of the flushing operation the hose 10 will drain by gravity through pump 35 and pipe 71 back into the tank 7. Such movement of the handle of valve 33 from the position shown in solid lines in Figure 2 to its upright position shown in broken lines will cause it to engage switch 62 for energizing driving motor 61 of the truck tank evacuating pump 60.

While the hose reeling drum 20 may be of the spring wound type so that, after the hose has been pulled out and the tension on it relieved, a spring may turn drum 20 to rewind the hose, it is preferred that positive drive mechanism be provided for the hose winding operation. For that purpose, screw 28 may be driven positively by a chain 80 moved by an electric motor 81 through suitable reduction gearing. The drum, of course, will be turned by gearing 8 as the screw is rotated in the manner explained above. Energization of motor 81 may be controlled by a switching circuit including the slip rings 82 mounted on the insulating disk 83 carried by pipe 2 at the base of the reel axle. Brushes 84 in contact with these rings are connected to the motor circuit wires 85. The rings 82 are connected to switch wires 86 having a separable connection at 87, which wires extend along hose 10 to the switch 88 carried by the hose adjacent to the valve control handle 54 at the hose-connected end of pipe 4.

From the foregoing description it will be understood that if the liquid transfer apparatus of this invention is utilized on a tank truck employed to collect milk from relatively small farm storage tanks, the truck may be driven to a position convenient to such a storage tank. The operator will then open the door D in the side of the truck body to afford access to the hose 10 in compartment 13. Next he will swing the handle of valve 33 from the solid line position of Figure 2 to the broken line position to connect the hose 10 to the tank-filling or delivery pipe 34 and to close switch 62 for energizing motor 61 to drive the vacuum pump 60. Grasping the portion of this hose immediately outside box 12 in which its free end is stored, and adjacent to the diaphragm 14, the operator will withdraw from such box the free end of the hose completely protected by its sanitary sheath. He will then pull the house out from compartment 13, which will run through the aperture of guide block 27, unwinding the reel 20, and, through the gearing 8, rotating screw 28 to drive the guide block downward for supporting the hose adjacent to the reel.

When a sufficient length of hose 10 has thus been unreeled so that its free end can reach the farm storage tank, the operator will unscrew cap 49 and slide the telescoping sections 42, 43 and 44 of the sheath back to expose the portion of pipe 4 extending beyond approximately the end of tube section 41. The operator will then depress handle 54 to unseat valve 5, and will place the end of tube 4 in the storage tank. The suction produced in the tank 1 by pump 60 through pipe 6 will draw the milk past valve 5 and through the hose 10 and upright pipe 36 into the truck tank until the storage tank has been emptied. It will be noted that during this operation, even if the free end of the hose is thrust as far as possible toward the bottom of the storage tank, valve 5 will contact the tank bottom, affording clearance for flow of milk past it into the end of pipe 4.

When this liquid transfer operation has been completed the operator will release handle 54 to enable valve 5 to be seated by the spring acting on such handle, extend the sheath sections 44, 43 and 42 again over the end of tube 4, and replace cap 49, before returning the hose to the truck. By closing switch 88 adjacent to handle 54 the operator can now initiate operation of motor 81 to drive the drum 20 in the winding direction. As the drum rotates, guide block 27 will, of course, be moved upward by screw 28 at a speed to maintain its guide aperture substantially in registry with that portion of the drum groove in which the hose is being laid. As the reeling-in operation of the hose is completed, the operator will push its sheathed end through the aperture 15 in diaphragm 14 of box 12 far enough so that cap 49 will engage switch 73. The operator will then complete initiation of the hose-flushing operation by swinging the handle of valve 33 from the broken line position of Figure 2 to the solid line position to deenergize the motor 61 of tank-evacuating pump 60 and energize the motor 70 of flushing pump 35, as well as to change the connection of pipe 3 from pipe 34 to pump 35. The operator may merely close door D and proceed to the next milk pick-up station without any further attention to the hose flushing operation, which will proceed and be completed automatically in the manner described.

The germicide employed for the flushing operation will be of a type which is nonpoisonous, and which will not adulterate the milk or other liquid being handled. Consequently when the truck reaches the next stop the liquid transfer mechanism is again ready for immediate use.

I claim as my invention:

1. Liquid transfer mechanism comprising a hose, a normal discharge pipe, flushing mechanism, and means selectively operable to connect said hose to said normal discharge pipe for delivery of liquid thereto from said hose and to disconnect said hose from said flushing mechanism, or to connect said hose to said flushing mechanism for flow of flushing liquid therefrom through said hose and to disconnect said hose from said normal discharge pipe.

2. Liquid transfer mechanism comprising a flexible hose, convolution-defining shelf means operable to removably support said hose thereon in interconnected downwardly sloping convolutions disposing said hose in downwardly sloping condition throughout its length, a source of flushing liquid, means operable to force flushing liquid from said source into one end of said hose and through it while it is supported by said shelf means in such convolutions, and means connecting the other end of the hose to said liquid source independently of said hose, completing a flushing liquid circuit from said liquid source through said hose and back to said source independently of said hose, supporting of said hose on said shelf means enabling any residue of flushing liquid to drain from the hose back to said source when delivery of flushing liquid thereto is terminated.

3. Liquid transfer mechanism comprising a hose, a hose reel supported for rotation upon an upright axis and carrying said hose, a source of flushing liquid, means operable to force flushing liquid from said source into one end of said hose while wound upon said reel, and means operable to receive the other end of the hose while wound upon said reel and connected to said liquid source independently of said hose to return flushing liquid to said source from said hose along a course by-passing the hose, supporting of the hose on said reel enabling any residue of flushing liquid to drain from the hose back to said source when delivery of flushing liquid thereto is terminated.

4. Tank filling mechanism comprising a hose, a hose reel supported for rotation about an upright axis adjacent to the tank and carrying said hose, a normal discharge pipe connected to the tank, flushing mechanism, and means selectively operable to connect said hose to said normal discharge pipe for delivery of liquid to the tank from said hose and to disconnect said hose from said flushing mechanism, or to connect said hose to said flushing mechanism for flow of liquid therefrom into said hose wound upon said reel and for draining of flushing liquid from the hose while thus wound upon said reel, and to disconnect said hose from said normal discharge pipe.

5. Liquid transfer mechanism comprising a conduit having a free end portion immersible in a body of liquid to be transferred, a sheath carried by said conduit and disposable in retracted position at a location a substantial distance back from the free end of said conduit to leave the immersible end portion of said conduit exposed beyond said sheath, means guiding said sheath for extending movement from such location into a position covering such immersible end portion of said conduit and said free end of said conduit in a position spaced laterally from said conduit, closure means operable to close the end of said sheath adjacent to the end of said conduit when said sheath is in such extended position, flushing means, and means connecting said flushing means to said conduit and operable to force liquid through the interior of said conduit and through the space between the exterior of said conduit and said closure means and sheath in its extended position over the exterior of such immersible conduit portion, for washing both the interior and exterior of such immersible conduit portion.

6. Liquid transfer mechanism comprising a conduit having a free end, a retractable sheath in extended position covering the free end of said conduit and the portion adjacent thereto for a substantial distance back from such free end, closure means operable to close the end of said sheath adjacent to the end of said conduit when said sheath is in such extended position, and means guiding said sheath for movement lengthwise of said conduit into retracted position to uncover such free end and the conduit portion adjacent thereto.

7. Liquid transfer mechanism comprising a conduit having a free end, a retractable sheath encircling said conduit, anchored by one end to said conduit at a location remote from its free end and including a plurality of nesting telescoping sections extensible to dispose the other end of said sheath adjacent to the free end of said conduit, the internal cross section of the smallest of such sections being larger than the external cross section of the portion of said conduit which it encircles, and a cap securable to such other end of said sheath and over the free end of said conduit for maintaining said sheath in extended position.

8. Liquid transfer mechanism comprising a hose, a pipe connected to one end of said hose, a sheath encircling said pipe, a cap securable over the end of said sheath adjacent to the free end of said pipe, and means operable to force flushing liquid through said hose and pipe in one direction, out through the free end of said pipe, and in the reverse direction between said pipe and said sheath.

9. Liquid transfer mechanism comprising a hose, a pipe connected to one end of said hose, a sheath covering said pipe and composed of a plurality of telescoping sections anchored by one end to said pipe at a location remote from the free end thereof, and apertured at a location adjacent to its anchored end, a cap securable to the free end of said sheath in extended condition to close the end thereof adjacent to the free end of said pipe, and means operable to force flushing liquid through said hose and pipe in one direction, out through the free end of said pipe, and in the reverse direction between said pipe and said sheath for discharge through the sheath apertures.

10. Mechanism comprising a box, fluid supply mechanism, a conduit having one end projectable into said box and the other end connected to said fluid supply mechanism for flow of fluid from said fluid supply mechanism through said conduit and into said box, and control means for said fluid supply mechanism disposed in said box, engageable by the conduit end when projected into said box and operable to prevent energization of said fluid supply mechanism when such conduit end is not in engagement therewith.

11. Mechanism comprising a box, fluid supply mechanism, a conduit having one end projectable into said box and the other end connected to said fluid supply mechanism for flow of fluid from said fluid supply mechanism through said conduit and into said box, a valve, operable, when closed, to close said conduit end projectable into said box and valve-supporting means operable to support said valve from said conduit in open position when such conduit end is in the box and in position closing such conduit end when removed from the box.

12. Liquid transfer mechanism comprising a conduit including a hose, a hose reel supported for rotation about an upright axis and carrying said hose, flushing mechanism connected to the lower end of said conduit for flow of flushing liquid therefrom through said conduit, an elongated box having one end closed by an apertured, distensible diaphragm adapted to receive therein the upper end of the conduit, and return conduit means connecting said box to said flushing mechanism for flow of flushing liquid from said flushing mechanism through the interior of said conduit into said box, and from said box through said return conduit means back to the flushing mechanism.

13. Liquid transfer mechanism comprising a conduit including a hose, a hose reel supported for rotation about an upright axis adjacent to the tank and carrying said hose, flushing mechanism connected to the lower end of said conduit for flow of flushing liquid therefrom through said conduit, an elongated sheath spaced from but covering the upper end portion of said conduit, and closed at its end adjacent to such conduit end, and an elongated box having one end closed by an apertured, distensible diaphragm adapted to receive therein said sheath and the end of the conduit covered thereby, and return conduit means connecting said box to said flushing mechanism, whereby liquid may flow from said flushing mechanism through the interior of said conduit, in the reverse direction over the exterior of said sheathed conduit end portion between such conduit end and the sheath into said box, and from said box through said return conduit means back to the flushing mechanism.

14. Tank filling mechanism comprising a hose, a hose reel supported for rotation about an upright axis adjacent to the tank and carrying said hose, a normal discharge pipe connected to the tank, flushing mechanism, means selectively operable to establish communication of the lower end of said hose with said normal discharge pipe for delivery of liquid to the tank from said hose and to disconnect said hose from said flushing mechanism, or to establish communication of the lower end of said hose with said flushing mechanism for flow of flushing liquid therefrom through said hose and to disconnect said hose from said normal discharge pipe, an elongated sheath spaced from but covering the upper end portion of said hose and closed at its end adjacent to such hose end, an elongated box having one end closed by an apertured, distensible diaphragm adapted to accommodate therein said sheath and the end of the hose covered thereby, said box being operable to receive flushing liquid from the interior of said hose, and return conduit means connecting said box to said flushing mechanism for flow of flushing liquid from said box through said return conduit means back to the flushing mechanism.

15. The tank filling mechanism defined in claim 14, and means operable to create a partial vacuum in the tank for drawing liquid from the hose through the normal discharge pipe into the tank when the lower end of the hose is in communication with such discharge pipe.

16. The tank filling mechanism defined in claim 15, and a valve, supporting means disposed between the sheath and the hose end covered thereby and supporting said valve in position for closing such end of the hose, and valve control means adjacent to the sheath and operable to move said valve into position spaced from the end of the hose closable thereby.

17. Tank filling mechanism comprising a conduit connected to the tank, a valve, valve supporting means supporting said valve in position for closing the end of the conduit remote from said tank, and manually operable valve control means exteriorly of and carried by said conduit operable to shift said valve supporting means to move said valve into position spaced from the end of said conduit remote from said tank.

18. The tank filling mechanism defined in claim 17, and a sheath covering but spaced laterally from the end portion of the conduit remote from the tank, composed of a plurality of telescoping sections and anchored by one end to the conduit, a cap securable to the end of said sheath in extended condition to close the end thereof adjacent to the valve, the valve supporting means including a plurality of rods extending between said sheath and the conduit from the valve to a location beyond the anchored end of said sheath, and the valve control means being connected to said rods, and means carried by the conduit supporting the valve control means adjacent to the anchored end of said sheath.

19. Mechanism for filling a tank truck, comprising means operable to create a partial vacuum in the truck tank, a hose reel disposed adjacent to said tank and rotatable upon an upright axis, a hose carried by said reel, a tank filling pipe communicating with the truck tank, a tank containing flushing liquid, flushing pump mechanism connected to said flushing liquid tank and adapted to withdraw liquid therefrom, selectively operable means operable selectively to connect the lower end of said hose to said tank filling pipe and disconnect it from said flushing pump mechanism or to connect the lower end of said hose to said flushing pump mechanism and disconnect it from said tank filling pipe, a sheath covering the upper end portion of said hose and closed at its end adjacent to the upper hose end but spaced slightly both laterally and endwise from the upper hose end portion for flow of liquid from said flushing pump mechanism through said hose and over the exterior of the upper hose end portion within said sheath, and means operable to return to said flushing liquid tank flushing liquid discharged from said sheath.

20. Liquid transfer mechanism comprising a conduit having a free end, a retractable sheath in extended position covering the free end of said conduit and the portion adjacent thereto for a substantial distance back from such free end and having its inner surface spaced outwardly from the outer surface of said conduit, means guiding said sheath for movement lengthwise of said conduit to uncover the conduit portion adjacent thereto, valve operating means disposed at a location at the side of said retractable sheath remote from such free end of the conduit, and means interposed between the exterior of said conduit and the interior of said retractable sheath and interconnecting said valve operating means and said valve and actuated by said valve operating means to effect movement of said valve between a position closing such free end of the conduit and open position.

References Cited in the file of this patent

UNITED STATES PATENTS

| Number | Name | Date |
|---|---|---|
| 461,698 | Anderson | Oct. 20, 1891 |
| 620,224 | Bubser | Feb. 28, 1899 |
| 1,457,743 | Morris | June 5, 1923 |
| 1,580,828 | Harvey | Apr. 13, 1926 |
| 1,687,446 | Hedgcock | Oct. 9, 1928 |
| 1,721,924 | Sandell | July 23, 1929 |
| 1,859,293 | Engbrecht | May 24, 1932 |
| 1,865,355 | Carpenter | June 28, 1932 |
| 2,077,460 | Coffelder | Apr. 20, 1937 |
| 2,213,069 | Engels | Aug. 27, 1940 |